US009298334B1

(12) United States Patent
Zimmerman et al.

(10) Patent No.: US 9,298,334 B1
(45) Date of Patent: Mar. 29, 2016

(54) METHOD AND APPARATUS FOR PROVIDING A USER INTERFACE HAVING A GUIDED TASK FLOW AMONG A PLURALITY OF DEVICES

(75) Inventors: Gary D. Zimmerman, Garden Valley, ID (US); DeVerl Stokes, Eagle, ID (US); Brian Mahaffy, Boise, ID (US); Bryan Allen, Meridian, ID (US)

(73) Assignee: MARVELL INTERNATIONAL LTD. (BM)

( * ) Notice: Subject to any disclaimer, the term of this patent is extended or adjusted under 35 U.S.C. 154(b) by 586 days.

(21) Appl. No.: 13/396,902

(22) Filed: Feb. 15, 2012

Related U.S. Application Data

(60) Provisional application No. 61/444,522, filed on Feb. 18, 2011, provisional application No. 61/451,786, filed on Mar. 11, 2011.

(51) Int. Cl.
*G06F 3/048* (2013.01)

(52) U.S. Cl.
CPC ...................... *G06F 3/048* (2013.01)

(58) Field of Classification Search
CPC . H04N 21/42207; G06F 3/048; G06F 9/4443; G06F 8/34; G06Q 10/06
USPC ........................................................ 715/740
See application file for complete search history.

(56) References Cited

U.S. PATENT DOCUMENTS

| | | | |
|---|---|---|---|
| 5,956,487 A | 9/1999 | Venkatraman et al. | |
| 6,127,941 A * | 10/2000 | Van Ryzin | G08C 17/02 340/12.53 |
| 6,437,836 B1 * | 8/2002 | Huang | G06F 1/1626 340/12.54 |
| 7,111,242 B1 * | 9/2006 | Grooters | G06F 8/38 715/716 |
| 7,533,099 B2 | 5/2009 | Solyanik et al. | |
| 7,701,606 B2 | 4/2010 | Lee | |
| 7,945,846 B2 * | 5/2011 | Beauchamp | G06F 17/30563 715/201 |
| 8,042,049 B2 * | 10/2011 | Killian | G06F 3/0481 340/3.1 |
| 8,054,211 B2 * | 11/2011 | Vidal | G08C 17/02 341/176 |
| 8,249,653 B2 * | 8/2012 | Hall | H04W 12/08 101/2 |
| 2002/0190956 A1 * | 12/2002 | Klein | G06F 1/1626 345/169 |
| 2003/0043272 A1 | 3/2003 | Nagao et al. | |
| 2003/0103038 A1 * | 6/2003 | Wong | G06F 1/1626 345/158 |
| 2005/0027794 A1 * | 2/2005 | Decker | G08C 17/00 709/201 |
| 2005/0097478 A1 * | 5/2005 | Killian | G06F 3/0481 715/851 |
| 2005/0105129 A1 * | 5/2005 | Takahashi | H04N 1/00204 358/1.15 |
| 2005/0149501 A1 * | 7/2005 | Barrett | G06F 9/4443 |

(Continued)

OTHER PUBLICATIONS

Lifehacker, Jan. 2, 2010, pp. 1-4 http://web.archive.org/web/20100102050122/http://lifehacker.com/5369381/turn-your-windows-7-pc-into-a-wireless-hotspot.*

*Primary Examiner* — Scott Baderman
*Assistant Examiner* — Mario M Velez-Lopez

(57) ABSTRACT

Systems, methods, and other embodiments associated with providing a user interface having a guided task flow among a plurality of devices are described. According to one embodiment, a method includes receiving, by a first device, a request from a second device requesting a user interface. The request includes a parameter describing a configuration of the second device. The second device is remote from the first device and includes a display. The method also includes generating, from a template user interface, a user interface for the second device based, at least in part, on the parameter. The user interface includes a task flow for controlling the first device to perform a series of tasks. The method includes providing the user interface to the second device for display on the display of the second device.

20 Claims, 10 Drawing Sheets

(56) References Cited

U.S. PATENT DOCUMENTS

| | | | | |
|---|---|---|---|---|
| 2006/0064693 A1* | 3/2006 | Messer | ................... | G06F 8/38 718/100 |
| 2006/0107265 A1* | 5/2006 | Schulz | ................... | G06Q 10/06 718/100 |
| 2006/0150115 A1* | 7/2006 | Jin | ................... | G06F 3/0482 715/764 |
| 2007/0027894 A1* | 2/2007 | Bridges | ................... | G06Q 10/00 |
| 2007/0279389 A1* | 12/2007 | Hoch | ................... | G06F 3/14 345/169 |
| 2008/0046803 A1* | 2/2008 | Beauchamp | ...... | G06F 17/30563 715/212 |
| 2008/0079689 A1* | 4/2008 | Koskinen | ................... | G09G 5/00 345/156 |
| 2009/0024942 A1* | 1/2009 | Pendergast et al. | ........... | 715/764 |
| 2012/0079409 A1* | 3/2012 | Luo | ................... | G06F 8/36 715/772 |
| 2012/0204115 A1* | 8/2012 | Barrett | ................... | G06F 9/4443 715/744 |

\* cited by examiner

METHOD AND APPARATUS FOR PROVIDING A USER INTERFACE HAVING A GUIDED TASK FLOW AMONG A PLURALITY OF DEVICES

CROSS REFERENCE TO RELATED APPLICATIONS

This patent disclosure claims the benefit of U.S. Provisional Application Nos. 61/444,522 filed on Feb. 18, 2011 and 61/451,786 filed Mar. 11, 2011, which are hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A multifunction device generally incorporates the functionality of multiple devices. For example, functions typically performed by multifunction devices include printing, scanning, faxing, and copying, providing access to a network (e.g., for email services), and so on. A multifunction device typically includes a user interface (or control panel) that permits a user to operate or otherwise control the various functions of the multifunction device. However use of such a control panel generally requires that a user be physically located proximate to a multifunction device to permit the user to operate the multifunction device.

SUMMARY

In one aspect, the present disclosure describes a controller for a first device including an interface logic and a control logic. The interface logic is configured to receive a parameter from a second device that is remote from the first device and includes a display. The interface logic is configured to generate a user interface based, at least in part, on the parameter received from the second device. The user interface includes a task flow for controlling the first device to perform a series of tasks. The interface logic is configured to provide the user interface to the second device for display on the display of the second device. The interface logic is also configured to receive, from the second device, a control signal including an indication of a first task selected from the series of tasks in the task flow, the first task having been selected through the user interface displayed on the display of the second device. The control logic is configured to, in response to the indication contained in the control signal, control the first device to automatically perform the first task selected from the series of tasks in the task flow.

In another aspect, the present disclosure describes a method including receiving, by a first device, a request from a second device requesting a user interface. The request includes a parameter describing a configuration of the second device. The second device is remote from the first device and includes a display. The method also includes generating, from a template user interface, a user interface for the second device based, at least in part, on the parameter. The user interface includes a task flow for controlling the first device to perform a series of tasks. The method includes providing the user interface to the second device for display on the display of the second device.

In another aspect, the present disclosure describes an integrated circuit in a controller for a first device including an interface logic and a control logic. The interface logic is configured to receive a parameter from a second device that is remote from the first device and includes a display. The interface logic is configured to generate a user interface based, at least in part, on the parameter received from the second device. The user interface includes a task flow for controlling the first device to perform a series of tasks. The interface logic is configured to provide the user interface to the second device for display on the display of the second device. The interface logic is also configured to receive, from the second device, a control signal including an indication of a first task selected from the series of tasks in the task flow, the first task having been selected through the user interface displayed on the display of the second device. The control logic is configured to, in response to the indication contained in the control signal, control the first device to automatically perform the first task selected from the series of tasks in the task flow.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are systems, methods, and other embodiments associated with providing a user interface having a guided task flow among a plurality of devices. In one embodiment, a first device (e.g., a multifunction device) remotely provides a user interface to a second device (e.g., a mobile device). Accordingly, using the example devices mentioned above, a user interface can be remotely provided from the multifunction device to the mobile device to permit a user of the mobile device to operate the multifunction device from the mobile device. By remotely providing the user interface to the mobile device, the multifunction device can take advantage of a user's familiarity with their own mobile device while also using robust features associated with the display of the mobile device to provide access to functions of the multifunction device.

In one embodiment, the user interface can be configured to include a guided task flow along with other accessibility options. In one embodiment, the guided task flow provides a sequence of multi-step tasks in a simplified one-touch task format. In this way, users can seamlessly access and control functions of the multifunction device through the display of the mobile device. While a multifunction device is discussed as remotely providing a user interface, other devices such as home theater electronics (e.g., AV receivers), digital video recorders, automobile media consoles, televisions, wireless routers, and so on may also implement such functionality to remotely provide one or more user interfaces to one or more other devices.

Figure 1:
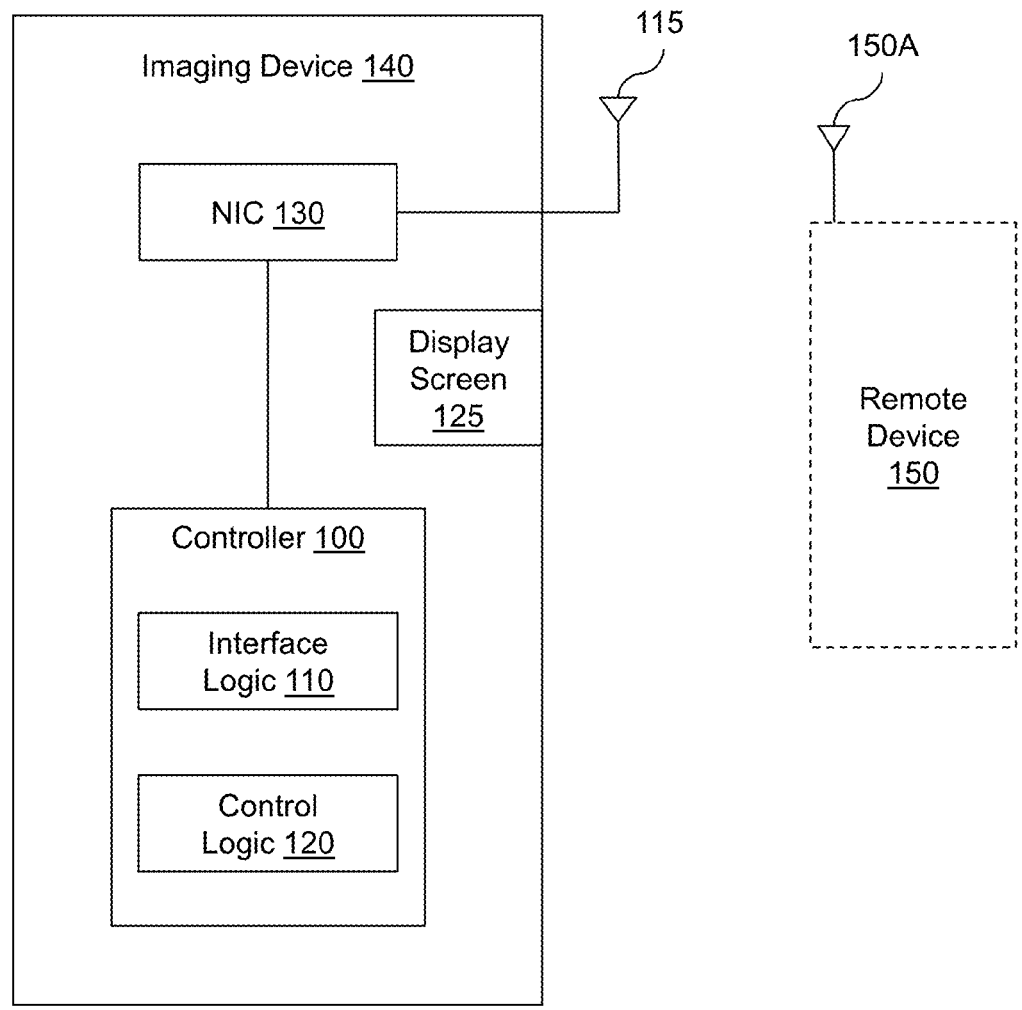
FIG. 1 illustrates one embodiment of a controller associated with providing a user interface having a guided task flow among a plurality of devices.

FIG. 1 illustrates one embodiment of a first device (e.g., imaging device 140) that is configured to wirelessly communicate with a second device (e.g., remote device 150). The imaging device 140 can be a multifunction device, or more generally, any other device as mentioned above. In one embodiment, the imaging device 140 includes a controller 100, a display screen 125, a wireless network interface card (NIC) 130, and an antenna 115. In general, the imaging device 140 can include one or more other components (not shown, e.g., imaging mechanisms, scanning mechanisms, paper feeders, and so on).

In one embodiment, the controller 100 includes interface logic 110 and control logic 120. The interface logic 110 is, for example, configured to generate a user interface in response to a request from a remote device (e.g., remote device 150), which user interface is provided to the remote device via the NIC 130 and the antenna 115. Additionally, in one embodiment, the control logic 120 is configured to receive signals (e.g., control signals) from the user interface remotely provided to the remote device 150, and control the imaging device 140 to perform functions (e.g., print, scan, fax, and so on) based on the signals.

Accordingly, the imaging device 140 allows a remote device (e.g., remote device 150) to request that a user interface be remotely sent to the remote device to permit a user to control operation of the imaging device 140 via the user interface as displayed on a display of the remote device. Such a process of allowing a user to remotely control the imaging device 140 provides an alternative to conventional techniques which typically requires a user to be located proximate to a device for interaction through a built-in display screen of the device. In this way, a user can remotely control the imaging device 140 (without having to be physically located proximate to the imaging device 140) by accessing functions through the user interface remotely provided to a remote device of the user. Furthermore, the user interface may be configured to exploit native features of the remote device 150 to provide additional functionality and accessibility that may be difficult to provide in a display screen on the imaging device 140.

For example, users are often more familiar interacting with their own personal devices than a display screen attached to a printer. Additionally, personal remote devices may include robust devices such as smartphones, personal digital assistants (PDAs), laptop computers, tablet computers, portable media players (e.g., mp3 players), desktop computers, and so on. Many of these remote devices include input mechanisms such as high resolution touch screens, touchpads, keyboards, and/or mice. Thus, by permitting users to control the imaging device 140 without being proximate to the imaging device 140 and through the input mechanisms associated with a remote device, functions and accessibility of the imaging device 140 may be improved.

In one embodiment, the interface logic 110 is configured to generate and remotely provide a user interface that enables the remote device 150 to remotely control the imaging device 140. In one embodiment, the user interface is provided to the remote device 150 in response to a request received from the remote device 150. The remote device 150 is configured, for example, to provide the request after discovering the imaging device 140 on a wireless network. The remote device 150 may discover the imaging device 140 from a beacon message that the imaging device 140 repetitively transmits to announce that the imaging device 140 is available. In another embodiment, the remote device 150 is manually configured to communicate with the imaging device 140, preconfigured from a previous connection directly to the imaging device 140, and so on. In one embodiment, the remote device 150 provides the request to the imaging device 140 through a wired connection such as a wired network (not shown). Accordingly, the request may be sent to the imaging device 140 on an action of a user or when a wireless network of the imaging device 140 is detected when the remote device 150 is manually configured or preconfigured.

To request the user interface, the remote device 150, for example, sends a request in the form of a wireless transmission to the imaging device 140. In one embodiment, the request includes parameters that describe a configuration of the remote device 150. For example, parameters may include a resolution and orientation of a display screen of the remote device 150, user credentials for a user of the remote device 150, capabilities (e.g., memory size, encryption capabilities) of the remote device 150, and so on. In one embodiment, the parameters are provided to be compatible with an HTML5 standard, a Flash standard, and so on. In response to receiving a request including such parameters, the imaging device 140 is configured to generate a user interface based on the parameters. In one embodiment, if the remote device 150 does not provide parameters in the request, the imaging device 140 will provide a user interface having a default configuration.

Figure 3:
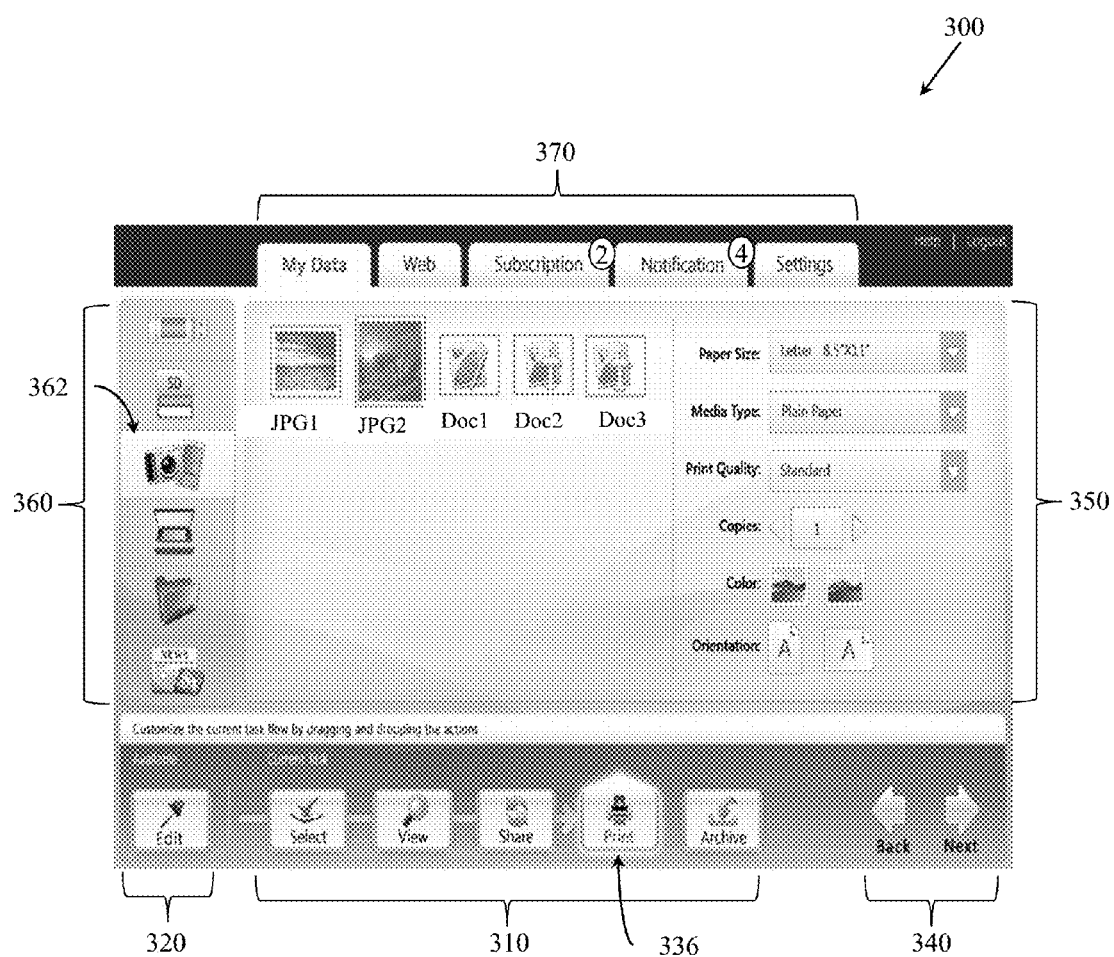
FIGS. 3-9 are example screenshots of a user interface having a guided task flow in accordance with various embodiments.
Figure 4:
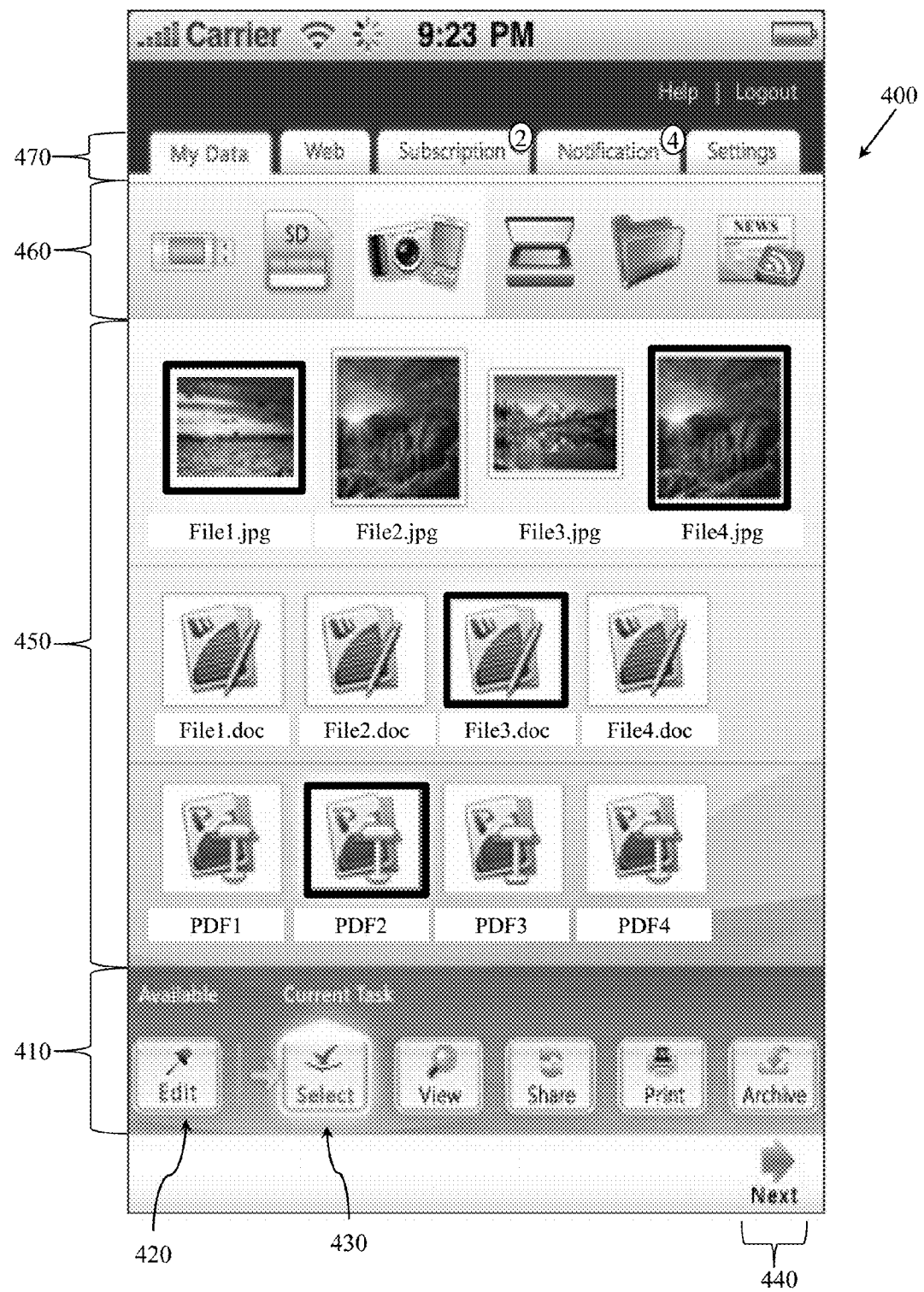

As an example, consider a user interface 300 of FIG. 3 in comparison to a user interface 400 of FIG. 4. The user interface 300 is configured to display at a resolution of 1280×720 in a landscape orientation. The user interface 400 is configured to display at a resolution of 320×480 in a portrait orientation. The differences between the user interface 300 and the user interface 400 represent differences in configurations of devices that may use and display a user interface. Thus, a resolution and orientation that is well suited for a first device (e.g., smartphone) associated with user interface 400 may not work for a second device (e.g., tablet computer) associated with user interface 300 and vice versa. Accordingly, in one embodiment, the user interface is dynamically generated to utilize abilities of a requesting device.

With reference again to FIG. 1, the interface logic 110 is, for example, configured to generate the user interface according to the parameters in the request. If the parameters include a screen resolution and orientation of the remote device 150, the interface logic 110 formats the user interface to display on the remote device 150 according to the resolution and orientation from the request.

In another embodiment, the interface logic 110 is configured to generate the user interface to remotely provide to the remote device 150 based, at least in part, on additional parameters (e.g., security credentials/privileges) from the request. For example, the interface logic 110 may generate the user interface according to user credentials for a user of the remote device 150. When generating the user interface according to the user credentials, the interface logic 110 may include only a subset of available functions in the user interface. The subset of actions included in the user interface may depend on the user's security credentials (e.g., level of permitted access). Thus in one embodiment, the interface logic 110 will only include features in the user interface associated with functions of the imaging device 140 that a user is approved to use.

In one embodiment, the user interface includes features for controlling the imaging device 140 to perform actions including selecting files from different sources, viewing files, editing files, sharing files via a network (e.g., the Internet), print files, scan, archive files to storage, and so on. In one embodiment, the different sources include a storage device within the imaging device 140, a storage device attached to the imaging device 140, and so on. To provide access to these features, the user interface is, in one embodiment, configured to include a task flow that includes a series of tasks. For example, the interface logic 110 is configured to populate the series of tasks with individual tasks for controlling the imaging device 140 to perform various functions. For example, the task flow is a sequential list of tasks that may be performed for a group of files. A user can sequentially perform multiple tasks on a group of files by progressing through the task flow one task at a time.

In one embodiment, the interface logic 110 is configured to populate an individual task with a set of actions. When the individual task is activated in the user interface on the remote device 150, a signal is sent from the remote device 150 to the imaging device 140 that includes an indication of the selected task from the series of tasks in the task flow displayed on the remote device 150. The imaging device 140 provides the signal to, for example, the interface logic 110 or the control logic 120. The interface logic 110 may provide the signal to the control logic 120 to control the imaging device 140 to perform a task or the interface logic 110 may provide a signal back to the user interface on the remote device 150 if the task is, for example, related to modifying the user interface, displaying images on the user interface, and so on. The control logic 120 is configured to control the imaging device 140 to automatically perform the set of actions for the individual task that was selected by the user of the remote device 150 upon receiving the signal. In this way, the user can control the imaging device 140 to perform a set of actions of the selected task without manually initiating each action for a task individually and for each file on which the task is to individually operate.

In one embodiment, a task is a batch flow task. A batch flow task may be configured to cause the imaging device 140 to iteratively perform a set of actions for a plurality of files based on a single action by the user of the remote device 150. For example, the user interface may include a first task for selecting the group of files and a second task after the first in the task flow for automatically printing the group of files. Thus, in this example, when a user wants to process a large number of files the second task (e.g., print) is a batch flow task for iteratively performing actions related to printing for each file in the group. Thus, the imaging device 140 iteratively performs the set of actions on each file until all files have been printed. Thus, in this example, a single action by the user of selecting print causes all selected files to be printed. In this way, functions of the imaging device 140 can be simplified from multiple steps into a single selection through the task flow in the remote user interface.

The task flow is an example of how the user interface may improve a user's ability to perform tasks with the imaging device 140. The task flow guides a user through a series of tasks to simplify repetitive sequences. In one embodiment, the task flow is configured to sequentially guide a user through multiple functions of the imaging device 140 by arranging the tasks in a specific order to facilitate use of the imaging device 140 by a user via the remote device 150.

In one embodiment, the interface logic 110 is configured to arrange tasks in the series of tasks in a predefined order when generating the user interface. In one example, the task flow includes tasks for selecting files, viewing files, sharing files, printing files, and archiving files. Accordingly, the task flow includes a select task as an antecedent to other tasks. The select task occurs first in this example because the other tasks in the task flow use files as input and thus for the other tasks to operate they receive an input of selected files (e.g. dependent relationship). Additionally, certain other tasks such as "view" may occur prior to performing a share or print operation in order for the user to, for example, check that the appropriate files are selected. Thus, even though the view task is not essential for subsequent tasks to operate, it is beneficial if viewing occurs before, for example, printing.

Furthermore, in one embodiment, the interface logic 110 is configured to dynamically modify the predefined order of tasks. The interface logic 110 may remove a task, add a task, or re-arrange a task in the series of tasks. The interface logic 110 may modify the order based on a signal from the remote user interface associated with the user modifying the order. In one embodiment, the user modifies the order with a finger swipe, a drag and drop action, and so on. In this way, tasks that are not order dependent can be re-arranged and/or the user can add or delete optional tasks (e.g., share or view) based on personal preference.

Figure 2:
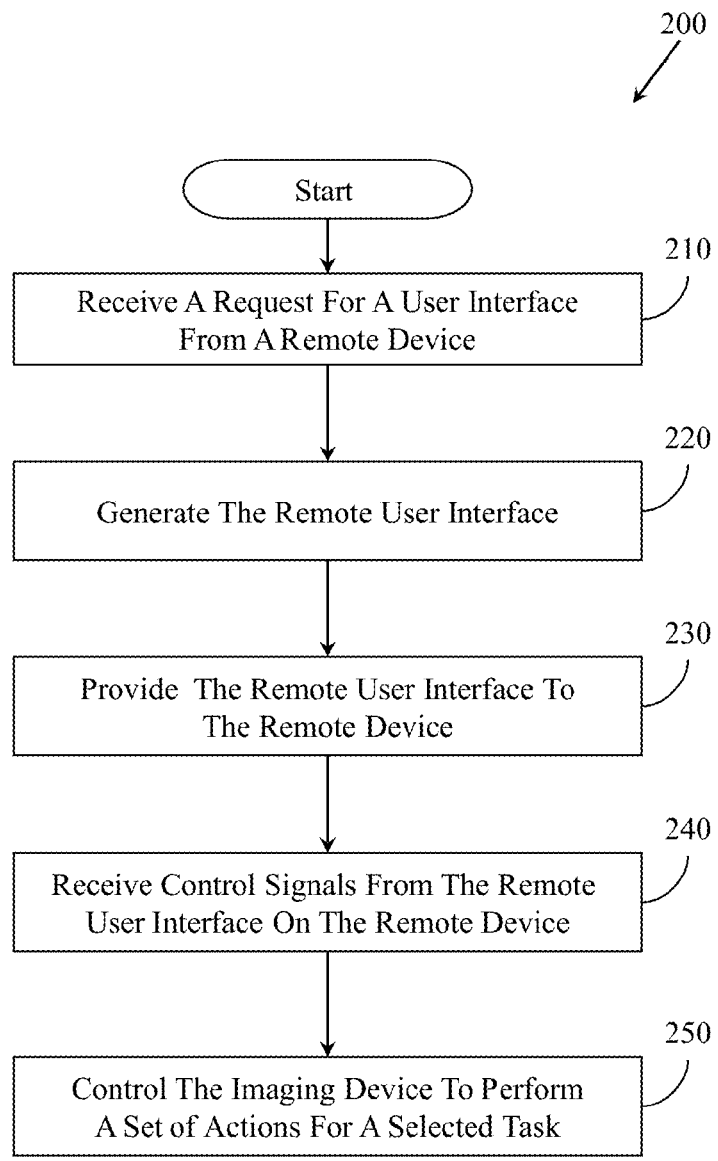
FIG. 2 illustrates one embodiment of a method associated with an imaging device that provides a user interface having a guided task flow.

Further details of the user interface and the task flow will be discussed in greater detail in conjunction with FIG. 2. FIG. 2 illustrates one embodiment of a method 200 associated with a user interface with a guided task flow. FIG. 2 is discussed from the perspective that the method 200 is implemented and performed by the apparatus 100 of FIG. 1 to generate the user interface and handle signals received from the user interface while operating on a remote device 150. The remote device can remotely control the imaging device 140 via the user interface. The following example will also refer to the components of FIG. 1. In the following discussion, only a single remote device 150 is discussed, however, multiple user interfaces on multiple remote devices may simultaneously communicate with the imaging device 140. In one embodiment, the controller 100 is configured to use the NIC 130 as a wireless access point, a mirco-access point using Wi-Fi Direct, and so on. In this way, the imaging device 140 provides a connection to the Internet for multiple remote devices. Additionally, the imaging device 140 may provide multiple user interfaces to multiple remote devices at the same time. However, for purposes of this discussion only a single remote device 150 will be discussed.

At 210, method 200 is initiated when the network interface card (NIC) 130 of the imaging device 140 receives a request for a user interface and forwards the request to the interface logic 110. The request is a message sent from a remote device (e.g., remote device 150) for a user interface so that the remote device 150 can use the functions of the imaging device 140. The remote device 150 may send a request in response to detecting the imaging device 140 or at the initiation of a user of the remote device 150.

In another embodiment, the user interface may be transmitted to a remote device without receiving a specific request. For example, the interface logic 110 may send the user interface upon the remote device 150 entering a wireless proximity of the imaging device 140. The imaging device 140 may automatically provide the user interface to the remote device 150 without receiving a request if the remote device 150 is known to the imaging device (e.g., has previously connected to the imaging device 140). The interface logic 110 can provide the user interface since the parameters associated with the remote device 150 have been received in previous sessions with the remote device 150. If the remote device 150 has not previously connected, then the imaging device 140 waits for a request before providing the user interface or provides a user interface with a default configuration.

At 220, the user interface is generated based on one or more parameters in the request. In one embodiment, generating the user interface includes formatting a template user interface to conform to a configuration of the remote device 150 as described by the parameters in the request (e.g., an HTML 5 request). For example, the interface logic 110 is configured to format a template user interface according to an orientation and resolution of a display of the remote device 150. In another embodiment, the interface logic 110 is configured to dynamically generate the user interface according to the parameters without using a template. The user interface may be an html (e.g., html 5) compatible web page that is served from the imaging device 140 via a built-in web server functionality.

Additionally, preferences and/or privileges associated with the remote device 150 may also be included in the request. If included, the interface logic 110 verifies security credential/privileges of the remote device before generating the remote user interface. The preferences and/or privileges are used to selectively include features specific to the privileges and/or preferences associated with the remote device 150. For example, if the remote device 150 is restricted to a limited set of privileges, then a limited or selected set of functions for the imaging device 140 are included in the user interface. In one embodiment, functions that the remote device 150 is not permitted to use are removed from a template user interface when generating the user interface. In this way, the user interface is custom generated for each remote device.

At 230, the imaging device 140 provides the user interface to the remote device 150 by, for example, wirelessly transmitting the remote user interface over a wireless network or direct wireless connection (e.g., WiFi direct). In one embodiment, by providing the remote user interface over a wireless network, the remote device 150 does not need to be physically attached to the imaging device 140 and thus can be anywhere within a wireless range of the imaging device 140. In another embodiment, if the imaging device 140 is accessible over a wide area network (WAN) or local area network (LAN), then the user interface can be provided to a remote device that is not within direct wireless range of the imaging device.

Additionally, in one embodiment, receiving the request at 210 and providing the user interface at 230 correspond with communications that establish the remote user device 150 as a member of a wireless network provided by the imaging device 140. Thus, in addition to simply using the wireless network to provide the user interface to remote devices, the controller 100 is configured to be a wireless access point (e.g., micro-access point compatible with Wi-Fi direct) and provide wireless network connectivity to remote devices. In another embodiment, the controller 100 is configured to provide a web server to serve the user interface as a web page (e.g., HTML5 or Flash compatible page) from the imaging device 140.

At 240, control signals are received from the user interface on the remote device 150. In one embodiment, the control logic 120 decodes the control signals and determines which actions the remote device 150 is requesting and whether privileges for the remote device 150 permit the actions to be performed. In another embodiment, the interface logic 110 receives the control signals and decodes the control signal to determine which actions of the imaging device the remote device is requesting and how the imaging device 140 will respond to the control signal. Accordingly, if the remote device 150 is permitted to request the actions, then at 250, method 200 controls the imaging device 140 to perform a set of actions for a selected task. The method also determines whether the control signals define a task flow.

In one embodiment, the selected task is a task in a task flow of the user interface. The task flow is for sequentially controlling the imaging device 140 to perform a series of tasks. In one embodiment, a task includes a subset of actions that cause the imaging device 140 to automatically perform a series of steps. The task flow and associated tasks will be discussed in greater detail with reference to FIGS. 3-9.

FIGS. 3-9 illustrate various screenshots of different user interfaces displayed on various remote devices. For example, FIG. 3 illustrates a screenshot of the user interface 300 on a tablet computer. Suppose that the tablet computer has a screen resolution of 1280×760 and a landscape display orientation. In this embodiment, the user interface 300 includes a task flow 310 that includes a select task, a view task, a share task, a print task 336 that is presently active, and an archive task. Edit task 320 is an available optional task that is presently not included the task flow 310 as shown. However, the task flow 310 can be dynamically modified to include edit task 320. In one example, the edit task 320 can be included in the task flow by a drag and drop operation that is performed through the touch screen interface of the tablet computer.

In FIG. 3, the task flow 310 is illustrated in a partially completed state. In this screenshot, the select task, the view task, and the share task are complete as illustrated by the connecting line with an arrow between the tasks. The print task 336 is active and information pane 350 in the remote interface 300 displays relevant settings for the print task 336. In the example screenshot, information pane 350 also includes thumbnails for files (e.g., JPG1, JPG2, Doc1, Doc2, Doc3) selected in the select task. The thumbnails are provided in the information pane 350 in this version of the user interface 300 since the screen resolution and orientation permit a greater amount of display area than what is provided, for example, on a print information pane 450 in FIG. 7 on a device with a smaller screen area.

With continued reference to FIG. 3, the user interface 300 also includes back and next arrows 340. The back and next arrows 340 are configured to progress through the tasks of task flow 310. For example, with the print task 336 presently active, selecting the back arrow 340 reloads the share task. Additionally, with the print task 336 presently active selecting the next arrow 340 causes the user interface 300 to send a signal to the imaging device 140. Thus, the imaging device 140 will perform a set of actions that cause the selected group of files to print. In one embodiment, the signal sent to the imaging device 140 includes, for example, an indication of the selected files displayed in information pane 350 and also the settings displayed in information pane 350. In this way, a user of the user interface 300 may modify settings for printing the files as a batch.

The user interface 300 also includes a source tab list 360. In FIG. 3, the selected source is a media device as denoted by the selected source tab 362. Selected source tab 362 denotes that the currently selected group of files are from a device or storage associated with the tab 362. However, it should be noted, in other embodiments, various files in the group of selected files can be from different sources in the tab list 360 even though tab 362 is displayed as the selected tab. As shown in the user interface 300, six different sources are available from tab list 360. The available sources, from top to bottom, are a flash drive attached to the imaging device 140, an SD card attached to the imaging device 140, a second remote device that is communicating with the imaging device 140, a scanner function in the imaging device 140, a storage device (e.g., network cloud storage) connected to the imaging device 140, and a news feed. In other embodiments more or less sources may be available and certain sources may be local sources of the remote device 150 on which the user interface is displayed or sources local to the imaging device 140. The sources tab list 360 may also include an archive option with access to previously archived files. In one embodiment, the archive option allows a user to search previously archived files according to metadata stored with the files. Additionally, access to sources in the tab list 360 may be limited based on privileges of the remote device 150.

The user interface 300 includes a separate media and settings tab list 370. Media and settings tab list 370 provide additional sources that may not be discrete data sources such as those of source tab list 360. For example, the additional sources may be a web browser, subscriptions to various email and social feeds, notification services, and so on. In one embodiment, the settings tab includes options for controlling a configuration of the imaging device 140. The settings tab may also include account information for various subscriptions and services in the subscription tabs, newsfeeds, and notifications.

FIG. 4 illustrates a screenshot of one embodiment of a user interface 400 generated for and displayed on a smartphone. In this example, the smartphone has a screen resolution of 320× 480 pixels and a portrait display orientation. The user interface 400 includes less display area than the user interface 300 of FIG. 3 that is generated for the tablet computer. Thus, the user interface 400 is adjusted for the different resolution and display orientation. In this embodiment, the user interface 400 includes elements similar to those in the user interface 300 of FIG. 3. For example, the user interface 400 of FIG. 4 includes a task flow 410 with current tasks and available tasks. In this example, the edit task is available but not part of the task flow and the select task 430 is the presently active task. The task flow 410 also includes a view task, a share task, a print task, and an archive task. Since the task flow 410 in FIG. 4 is on the first task in the sequence, only the next arrow 440 is available. The back arrow appears once the task flow has progressed past the first task in the sequence. Similar to FIG. 3, the user interface 400 of Figure includes a media and settings tab list 470, a source tab list 460, and an information pane 450.

In this example, the select task 430 is highlighted and active along with a media device source on the source tab list 460. Accordingly, the information pane 450 reflects available files from the media source that may be selected. Information pane 450 shows that four files (outlined in bold: file1.jpg, file4.jpg, file3.doc, and PDF2) have already been selected based on a user input from a touch screen interface for the smartphone (e.g., remote device 150) on which the user interface 400 is displayed.

Figure 5:
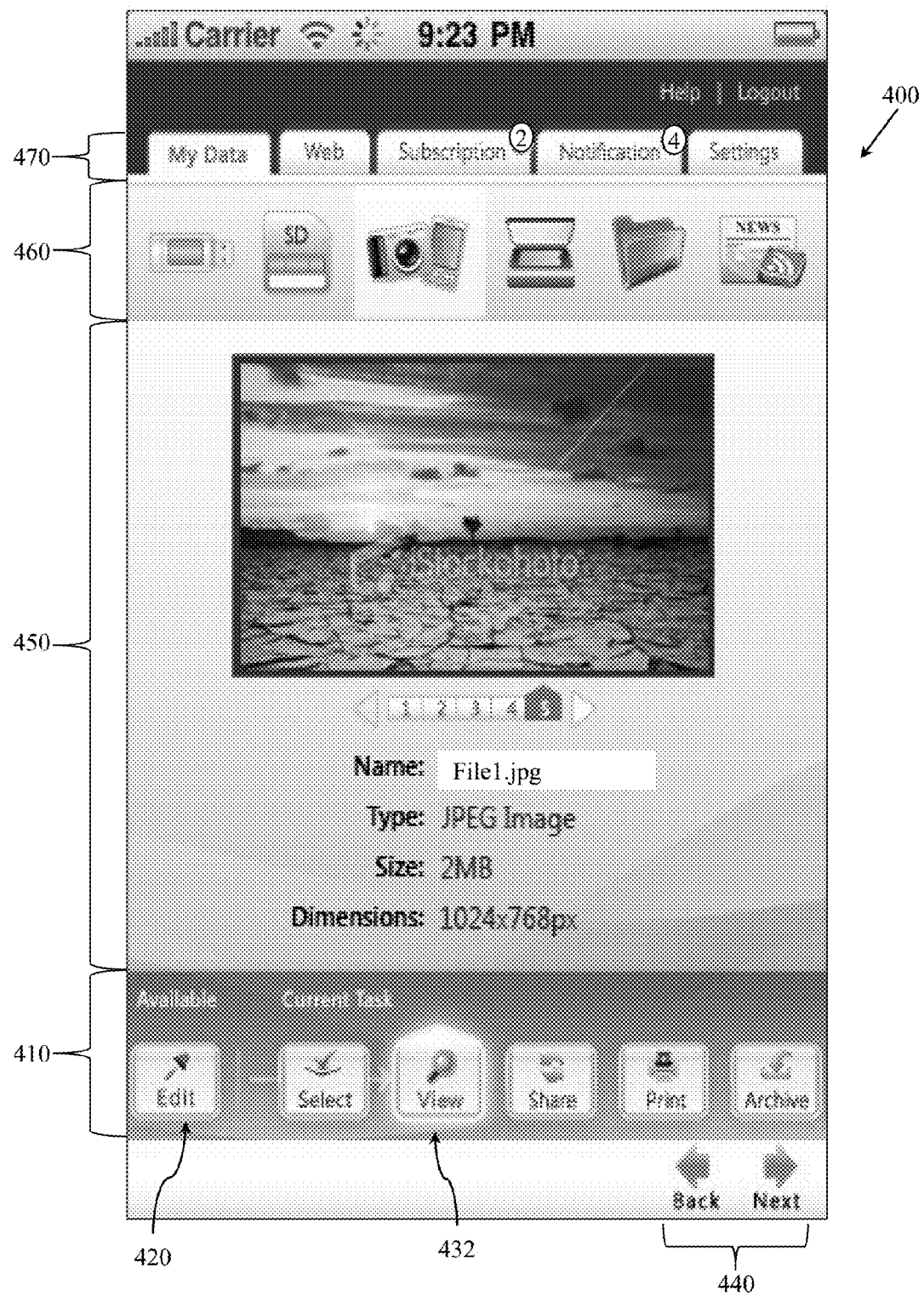

FIG. 5 illustrates a screenshot of the user interface 400 of FIG. 4 after the task flow 410 advances to the view task 432 from the select task 430 by a user selecting the next arrow 440. In FIG. 5, the back arrow is also present (adjacent the next arrow 440) since a user may backtrack in the task flow 410 to the previous task (i.e., select task 430). In one embodiment, when the task flow 410 advances from the select task 430 to the view task 432, the imaging device 140 receives a signal from the user interface 400 and may retrieve the selected files and provide them to the remote device 150, render thumbnails of the selected files and provide the thumbnails to the remote device 150, and so on. Thus, when the user interface 400 receives the files or the thumbnails the view task 432 may display a slideshow as seen in information pane 450 of FIG. 5.

It should be noted that even though tasks in the task flow 410 are discussed as requesting information from the imaging device 140 and causing the imaging device 140 to perform certain functions and actions, in other embodiments, at least part of this functionality and information may be performed by or stored on the remote device 150 on which the user interface 400 is displayed.

Figure 6:
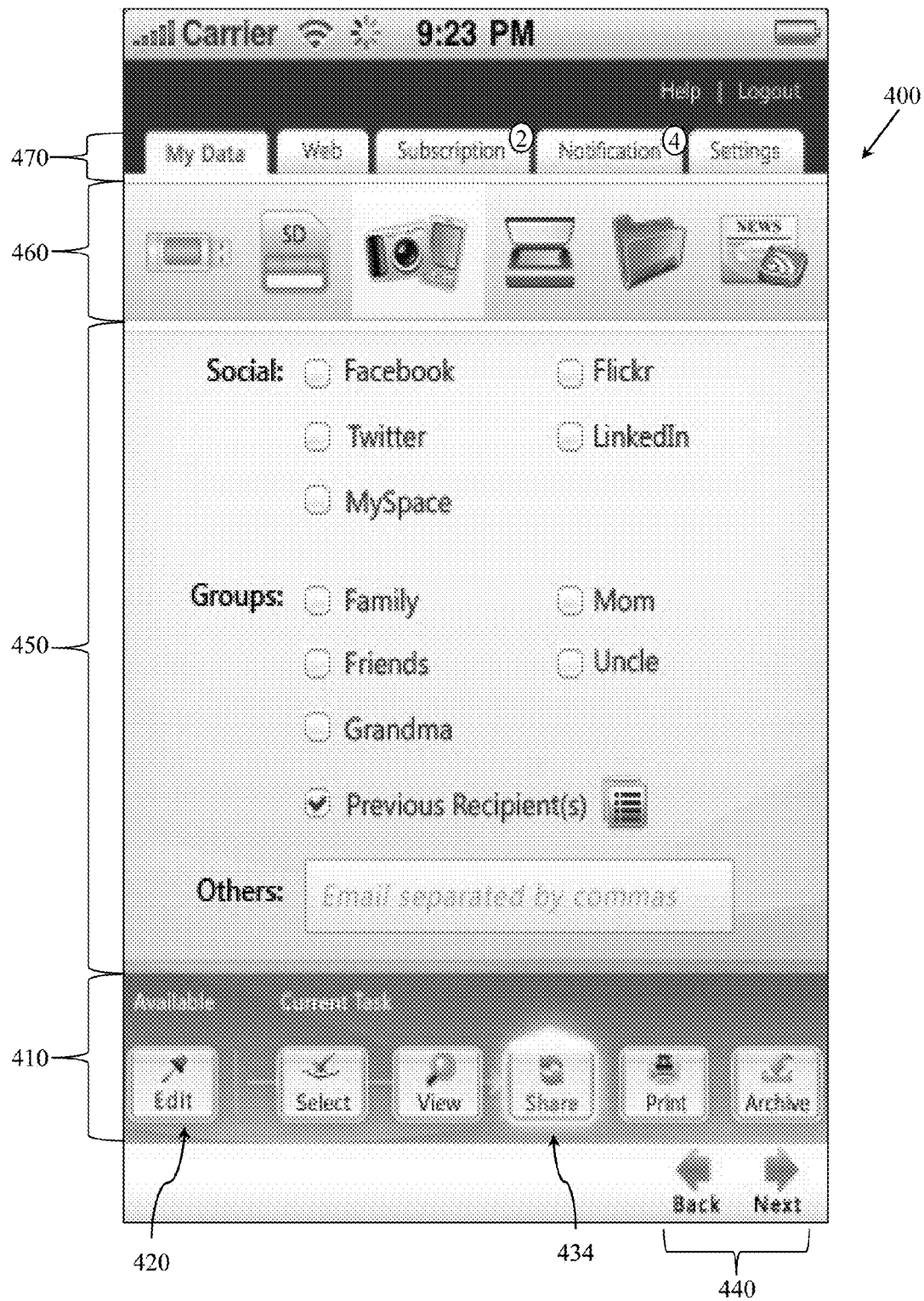

FIG. 6 illustrates a screenshot of the user interface 400 of FIGS. 4 and 5 after the task flow 410 advances to the share task 434 from the view task 432. When a user selects the next arrow 440 to advance to the share task 434, the user interface 400 may send a signal to the imaging device 140 to retrieve relevant information to populate the information pane 450. In FIG. 5, information pane 450 includes options for selecting which destinations will receive the files when they are shared. Accordingly, when a user selects a listed option or enters additional recipients in the provided fields, the selected files will be shared with those destinations when the next arrow 440 is selected. Upon the next arrow 440 being selected the selected files will be shared with each selected recipient on the information pan 450. In this way, the imaging device 140 may iteratively perform a set of actions associated with the share task 434 to provide the selected files to each recipient. Thus, when multiple recipients are selected, the share task 434 acts as a batch process to perform the set of actions for each recipient. For example, for the share task 434 the set of actions may include generating a message with the attached files and sending the message to the recipient destination. The set of actions may also include connecting to each social service and uploading the files. Accordingly, in this way, the share task 434 causes the imaging device to perform a set of actions iteratively for all selected recipients on a single action of the user of the user interface 400.

Figure 7:
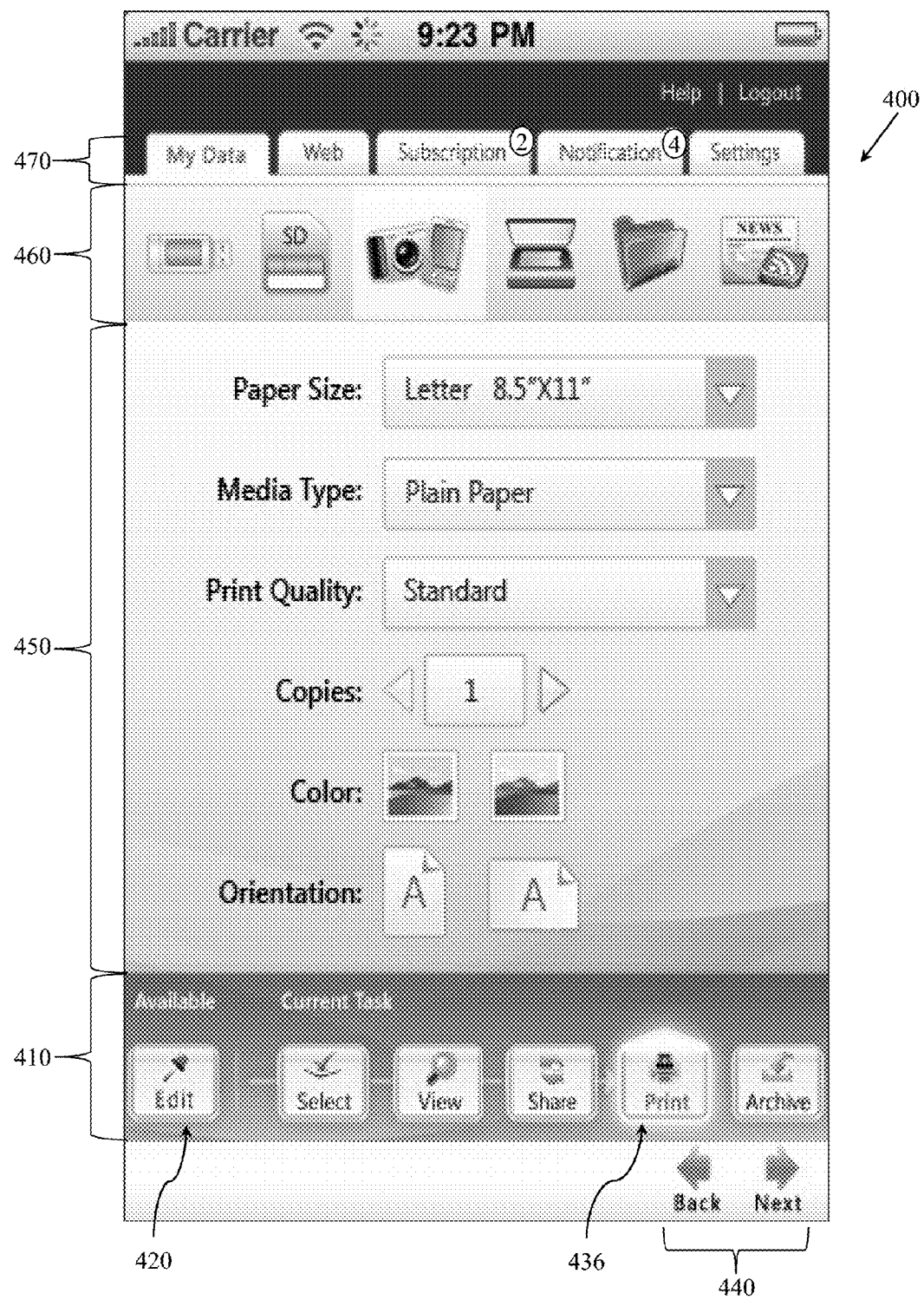

FIG. 7 illustrates a screenshot of the user interface 400 after the task flow 410 has been advanced to the print task 436. In this example, the information pane 450 includes information for configuring the imaging device when printing the selected files. The information pane 450 may be provided from the imaging device 140 upon selecting the print task 436 or populated when the user interface 400 is generated by the interface logic 110. In one embodiment, when a user advances from the print task 436 by selecting the next arrow 440, the user interface 400 provides a signal to the imaging device 140. The control logic 120 in the imaging device 140 is, for example, configured to control the imaging device 140 to print each selected file from the select task 430. In this way, the print task 436 from the task flow 410 causes the imaging device to perform a batch process (e.g., iteratively perform a set of actions) on the group of files. Thus, a user of the user interface 400 can avoid manually printing each file and instead simply uses one-click of the next arrow 440 to print the entire batch of selected files.

Figure 8:
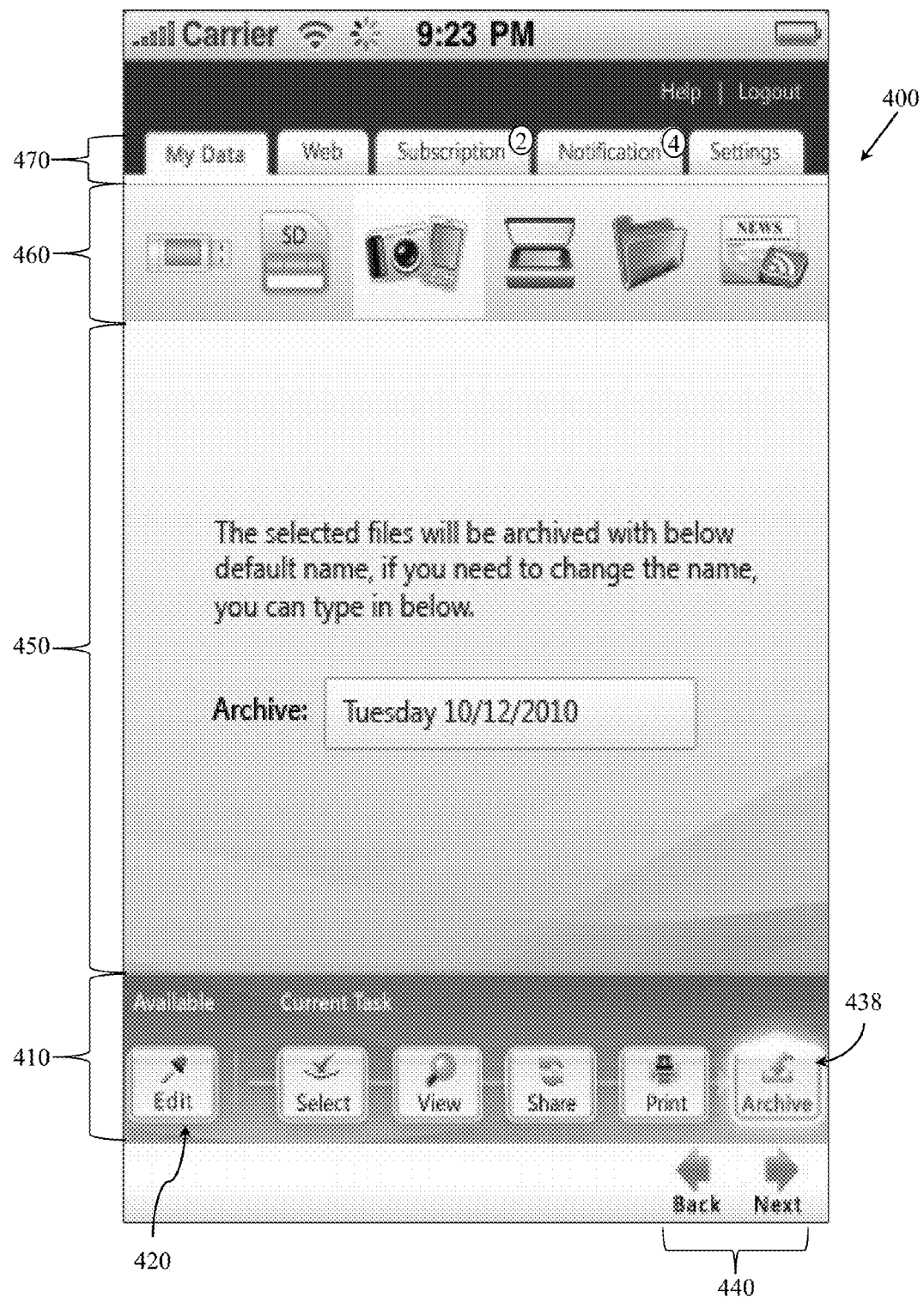

FIG. 8 illustrates a screenshot of the user interface 400 after the task flow 410 advances to the archive task 438. In this example, the information pane 450 includes information for archiving the selected files to a cloud storage location that is configured from the settings tab of tab list 470. In the illustrated embodiment, the only option in the information pane 450 is to change a name of an archive file. However, in other embodiments, the information pane 450 for the archive task 438 may include options for changing an archive location, adding a password to the archive file, and so on. In one embodiment, the options provided on the information pane may be based on privileges associated with the remote device 150 or user preferences. Once the next arrow 440 is selected for the archive task 438, the imaging device 140 will archive the selected files in a cloud storage location. The cloud storage is, for example, a storage location on a WAN, a storage location on the Internet, and so on. With the task flow 410 complete, the user interface 400 returns to the select task 430 as illustrated in FIG. 4, proceeds to a confirmation screen, or continues to a default screen determined by the interface logic 110.

Figure 9:
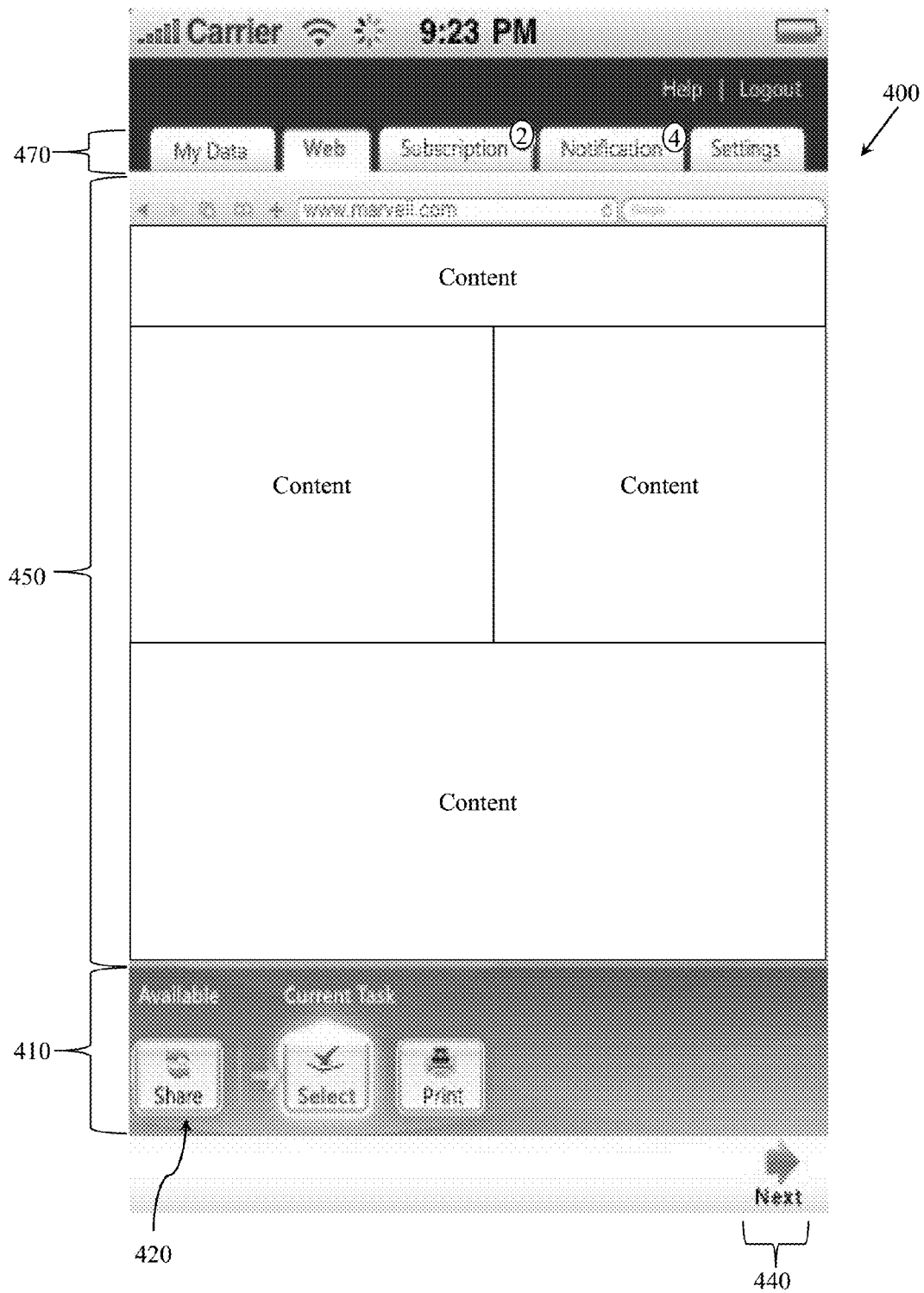

FIG. 9 illustrates a screenshot of the user interface 400 upon a user selecting the web tab in the media and settings tab list 470. When the web tab in the media and settings tab list 470 is selected, the information pane 450 includes a web browser (e.g., an html 5 compatible web browser) and the sources tab list 460 is not presented. The web tab provides one example of how the task flow 410 can be modified to be source dependent. In this example, since the web tab is selected, only the select task and the print task are in the series of tasks of the task flow 410. The share task 420 is available to be placed in the task flow 410 via a drag and drop operation, but is not presently part of the series of tasks of the task flow 410. The task flow 410 may be limited to these tasks for the web tab since they are the tasks most commonly used with the web tab source. Additionally, the task flow 410 may be limited in this way by user preferences or security privileges for the remote device 150 when the user interface 400 is originally generated by the interface logic 110. Other than limiting the task flow 410 for the web tab source, sources from the source tab list 460 may also have a limited task flow 410 in a similar manner.

Figure 10:
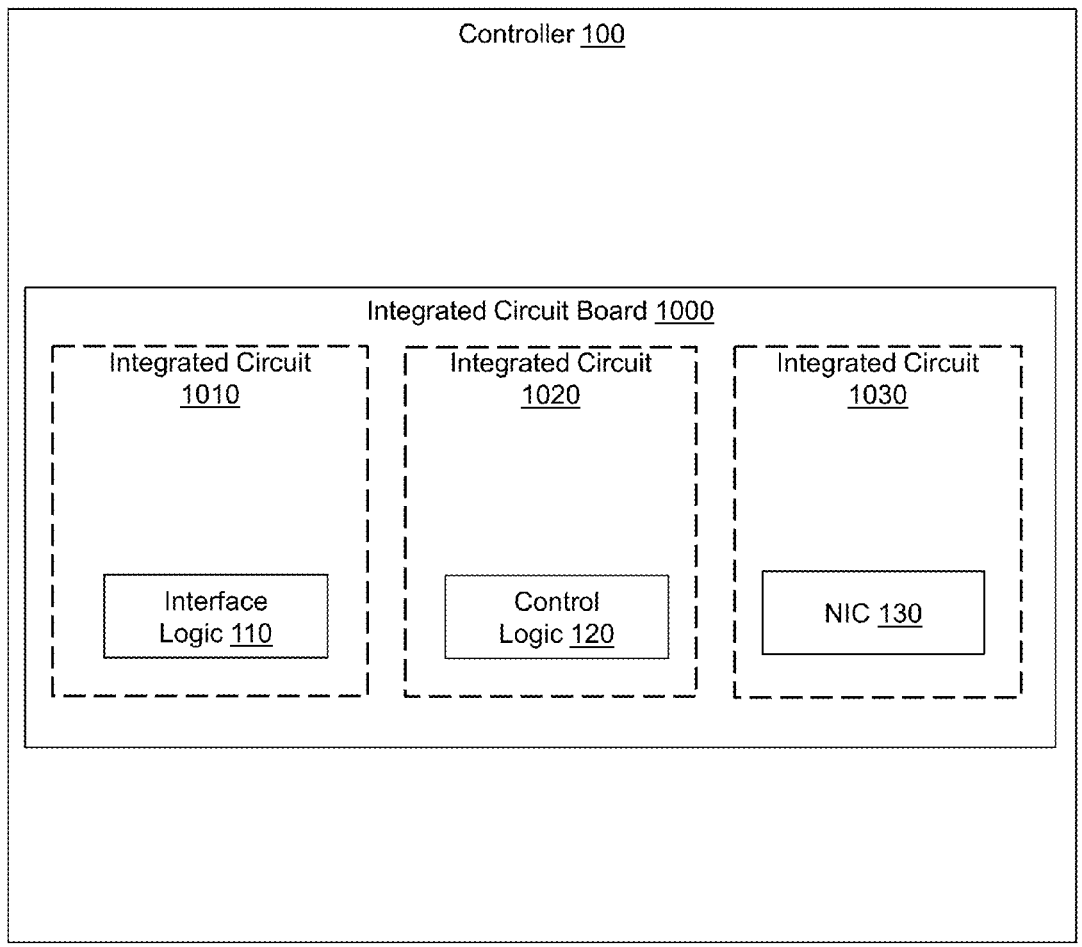
FIG. 10 illustrates one embodiment of an integrated circuit associated with a user interface having a guided task flow.

FIG. 10 illustrates another embodiment of the controller 100 from FIG. 1 that is configured with separate integrated circuits and/or chips. In this embodiment, the interface logic 110 from FIG. 1 is embodied as a separate integrated circuit 1010. Additionally, the control logic 120 is embodied on an individual integrated circuit 1020. The network interface card 130 is also embodied on an individual integrated circuit 1030. The circuits are connected via connection paths to communicate signals. While integrated circuits 1010, 1020, and 1030 are illustrated as separate integrated circuits, they may be integrated into a common circuit board 1000. Additionally, integrated circuits 1010, 1020, and 1030 may be combined into fewer integrated circuits or divided into more integrated circuits than illustrated.

In another embodiment, the logics 110 and 120, and NIC 130 illustrated in integrated circuits 1010, 1020, and 1030 may be combined into a separate application specific integrated circuit. In other embodiments, the functionality associated with the logics 110 and 120, an NIC 130 may be embodied as firmware executable by a processor.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory computer-readable medium or in execution on a machine, and/or combinations of each to perform a function(s) or an action(s), and/or to cause a function or action from another logic, method, and/or system. Logic may include a microprocessor programmed to perform one or more of the disclosed functions, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A controller for a first device, the controller comprising:
interface logic configured to:
receive a parameter from a second device, wherein the second device is a mobile device that is remote from the first device and includes a display, and wherein the first device is an imaging device,
generate a user interface based, at least in part, on the parameter received from the second device, wherein the user interface includes a task flow for controlling the first device to perform a series of tasks,
populate the task flow with tasks that correspond to functions capable of being performed by the first device,
wherein the interface logic is configured to populate the task flow with one or more tasks that correspond to native functions of the second device as indicated by the parameter to provide access to the native functions of the second device through the user interface,
provide the user interface to the second device for display on the display of the second device, and
receive, from the second device, a control signal including an indication of a first task selected from the series of tasks in the task flow, the first task having been selected through the user interface displayed on the display of the second device; and
control logic configured to, in response to the indication contained in the control signal, control the first device to automatically perform the first task selected from the series of tasks in the task flow.

2. The controller of claim 1, wherein the first task comprises a batch flow task configured to cause the first device to iteratively perform a set of actions on a plurality of files stored on the first device, wherein the interface logic is configured to arrange tasks in the series of tasks in a predefined order to sequentially guide a user of the second device through multiple multi-step functions capable of being performed by the first device,
wherein the predefined order is based, at least in part, on a dependence of tasks on other tasks in the series of tasks, wherein the dependence is a processing dependence that indicates when one task depends on processing of another task in the series of tasks.

3. The controller of claim 1, wherein:
the parameter comprises a resolution and an orientation for a display of the second device; and
the interface logic is configured to configure the user interface to cause the second device to display the user interface on the display of the remote device in accordance with the resolution and the orientation.

4. The controller of claim 1, wherein the first device is a multifunction printer.

5. The controller of claim 1, wherein the interface logic is configured to provide the user interface to a third device while simultaneously providing the user interface to the second device, wherein the third device is remote from each of the first device and the second device.

6. The controller of claim 1, wherein the interface logic is configured to arrange the series of tasks in the predefined order according to which tasks occur prior to other tasks in the series of tasks when processing a document, and wherein the controller is configured to provide network access to the second device.

7. The controller of claim 1, wherein the predefined order is based, at least in part, on a dependence of at least one task on other tasks in the series of tasks, and wherein the interface logic is configured to dynamically modify the predefined order by removing a task, adding a task, or re-arranging a task from the series of tasks based, at least in part, on a user input from the second device, wherein the interface logic is configured to receive drag and drop inputs from the user to modify the series of tasks.

8. A method, comprising:
receiving, by a first device that is an imaging device, a request from a second device requesting a user interface, wherein the request includes a parameter describing a configuration of the second device, and wherein the second device is a mobile device that is remote from the first device and includes a display;
generating, from a template user interface, a user interface for the second device based, at least in part, on the parameter, wherein the user interface includes a task flow for controlling the first device to perform a series of tasks,
wherein generating the user interface includes populating the task flow with tasks that correspond to functions capable of being performed by the first device, and wherein generating the user interface includes generating the user interface with one or more tasks in the task flow that correspond to native functions of the second device as indicated by the parameter to provide access to the native functions of the second device through the user interface; and
providing the user interface to the second device for display on the display of the second device.

9. The method of claim 8, comprising:
receiving, from the second device in the first device, a control signal including an indication of a first task selected from the series of tasks in the task flow, the first task having been selected through the user interface displayed on the display of the second device; and
controlling the first device to automatically perform the first task from the series of tasks in response to the indication in the control signal from the user interface on the second device,
wherein generating the user interface includes arranging tasks in the series of tasks in a predefined sequence to sequentially guide a user of the second device that displays the user interface through multiple multi-step functions capable of being performed by the first device,
wherein the predefined order is based, at least in part, on a dependence of tasks on other tasks in the series of tasks, and wherein the dependence is a processing dependence that indicates when one task depends on processing of another task in the series of tasks.

10. The method of claim 8, comprising:
dynamically modifying a sequence of the series of tasks by re-arranging a task in the series of tasks, removing a task, or adding a task.

11. The method of claim 8, wherein the sequence of the series of tasks is based, at least in part, on a dependence of at least one task on other tasks in the series of tasks, and wherein arranging tasks in the series of tasks in predefined sequence includes arranging the series of tasks according to which tasks occur prior to other tasks in the series of tasks when processing a document.

12. The method of claim 8, wherein the first task in the task flow is a batch flow task for controlling the first device to iteratively perform a set of actions on a plurality of files stored on the first device.

13. The method of claim 8, wherein the parameter includes a resolution and an orientation for the display of the second device and generating the user interface includes configuring the user interface to cause the second device to display the user interface on the display of the second device based on the orientation and resolution.

14. The method of claim 8, wherein the first device is a multifunction printer.

15. The method of claim 8, further comprising:
providing network access to the second device by the first device, wherein providing the user interface to the second device includes simultaneously providing a second user interface to a third device that is remote from each of the first device and the second device.

16. An integrated circuit in a controller of a first device that is an imaging device, the controller comprising:
interface logic implemented in hardware and configured to:
receive a parameter from a second device, wherein the second device is a mobile device that is remote from the first device and includes a display,
generate a user interface based, at least in part, on the parameter received from the second device, wherein the user interface includes a task flow for controlling the first device to perform a series of tasks,
populate the task flow with tasks that correspond to functions capable of being performed by the first device, wherein the interface logic is configured to populate the task flow with one or more tasks that correspond to native functions of the second device as indicated by the parameter, provide the user interface to the second device for display on the display of the second device, and receive, from the second device, a control signal including an indication of a first task selected from the series of tasks in the task flow, the first task having been selected through the user interface displayed on the display of the second device; and control logic implemented in hardware and configured to, in response to the indication contained in the control signal, control the first device to automatically perform the first task selected from the series of tasks in the task flow.

17. The integrated circuit of claim 16, wherein the first task comprises a batch flow task configured to cause the first device to iteratively perform a set of actions on a plurality of files stored on the first device, wherein the interface logic is configured to arrange tasks in the series of tasks in a predefined order to sequentially guide a user of the second device through multiple multi-step functions capable of being performed by the first device, wherein the predefined order is based, at least in part, on a dependence of tasks on other tasks in the series of tasks, and wherein the dependence is a processing dependence that indicates when one task depends on processing of another task in the series of tasks.

18. The integrated circuit of claim 16, wherein:

the parameter comprises a resolution and an orientation for a display of the second device, and the interface logic is configured to configure the user interface to cause the second device to display the user interface on the display of the remote device in accordance with the resolution and the orientation.

19. The integrated circuit of claim 16, wherein the interface logic is configured to provide the user interface to a third device while simultaneously providing the user interface to the second device, wherein the third device is remote from each of the first device and the second device and wherein the control logic is configured to provide network access to the second device.

20. The integrated circuit of claim 16, wherein the interface logic is configured to dynamically modify the predefined order by removing a task, adding a task, or re-arranging a task from the series of tasks based, at least in part, on a user input from the second device.

* * * * *